May 20, 1969 J. F. NICHOLSON 3,445,588
OPTICAL IMAGE SCANNING SYSTEM
Filed April 25, 1966
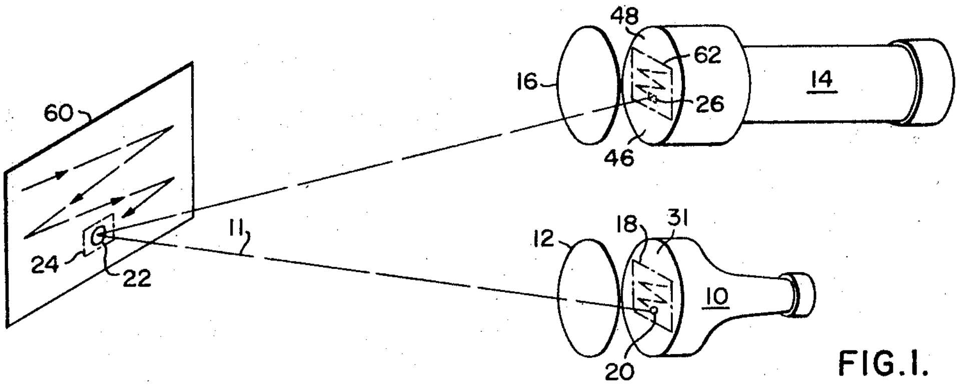
FIG.1.
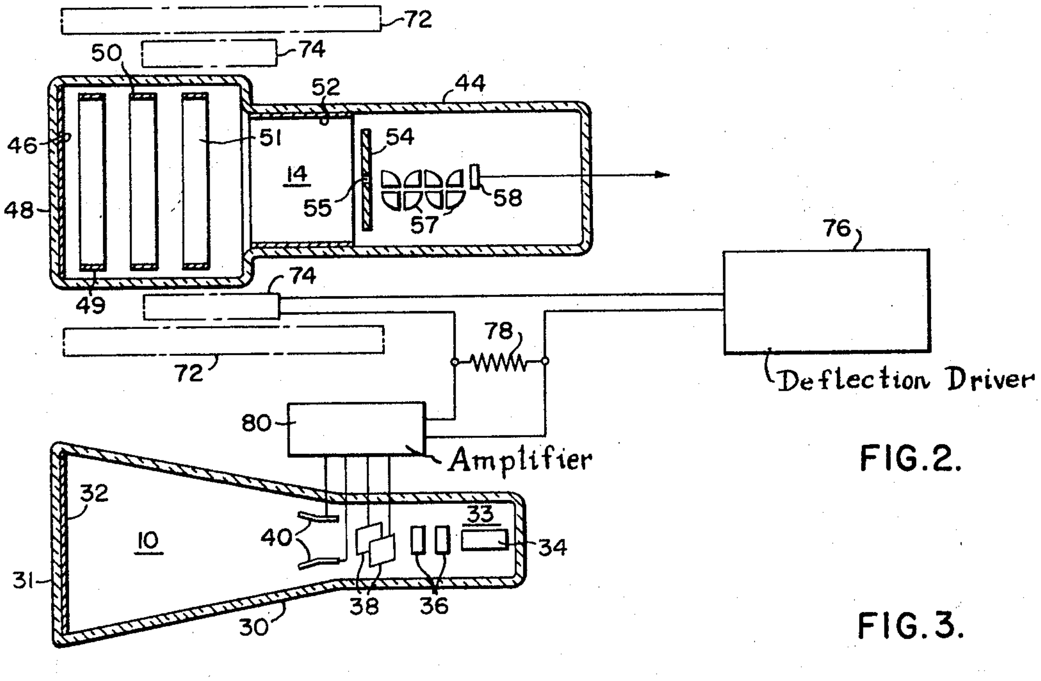
FIG.2. FIG.3.
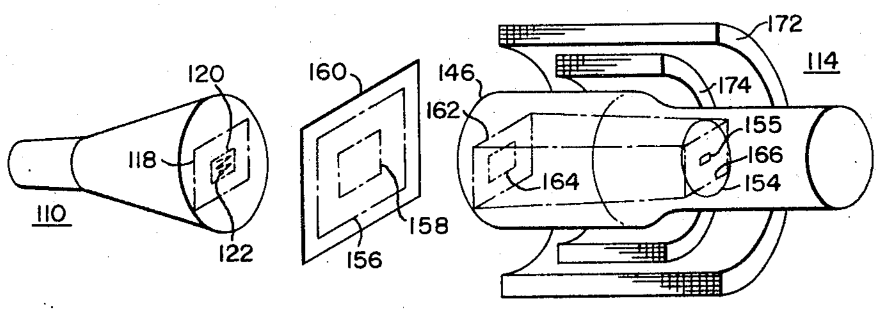
WITNESSES
Edwin E. Barber
Wm. B. Sellers
INVENTOR
James F. Nicholson
BY R. Lewis Gable
ATTORNEY United States Patent Office 3,445,588
Patented May 20, 1969

3,445,588

OPTICAL IMAGE SCANNING SYSTEM

James F. Nicholson, Pine City, N.Y., assignor to Westinghouse Electric Corporation, Pittsburgh, Pa., a corporation of Pennsylvania Filed Apr. 25, 1966, Ser. No. 545,122
Int. Cl. H04n 3/00, 5/38
U.S. Cl. 178—6.8 5 Claims

ABSTRACT OF THE DISCLOSURE

A constant intensity light beam of a flying spot scanner is projected and scanned across a target surface in synchronism with a light sensitive image dissector tube. The light beam deflecting signal is controlled by the image dissector deflecting signal.

This invention, in general, relates to electro-optical systems, and more particularly to optical imaging systems for scanning a scene with light, either visible or invisible, and for receiving and sensing radiation from the scanned scene.

Various electro-optical imaging systems have been proposed utilizing a flying spot scanner for projecting and scanning a ray or beam of light over a desired field of view. An object within the field of view will reflect a portion of the beam of light in accordance with the reflectivity of the object. The reflected light may be sensed by a photoelectric cell which translates the modulations of the reflected light into an electrical signal which may be applied to a display device such as a television monitor to provide a visual image of the object. However, typical photoelectric cells are not capable of discriminating between light reflected from that portion of the target being scanned and the remaining portions of the field of view. Thus, ambient light may be received from other parts of the scene thereby degrading or destroying the image viewed upon the monitor.

In a copending application, Ser. No. 424,577, to Homer A. Humiston and Fitz-Hugh B. Marshall, entitled, "Optical Imaging and Ranging System," and assigned to the assignee of this invention, a flying spot scanner system is suggested that substantially eliminates the problems associated with ambient light being reflected from the field of view. More specifically, the system as described in this copending application includes a flying spot scanner for projecting and scanning a beam of light across a field of view and an image dissector for selectively viewing that portion of the field of view upon which the beam of light is projected. An important aspect of this system is the provision of means for synchronizing the scanning of the projected beam of light and the corresponding manipulation of the portion of the field of view sensed by the image dissector. More particularly, a phase lag may be introduced by this means into the image dissector so that the portion sensed by the image dissector lags a small increment of time behind the scanning of the beam of light projected by the flying spot scanner. It may be understood that it does take a finite period of time for the light projected by the flying spot scanner to be directed upon the field of view and to be reflected to the image dissector. Thus, by measuring this increment of time or by measuring the phase shift between the relative scanning operations of the flying spot scanner and the image dissector, the distance between the optical system and the object being viewed may be determined.

Typically, the flying spot scanner system as described in the above identified copending application utilized a cathode ray tube using a phosphor with a very rapid decay time and an image dissector with an aperture large enough to sense several resolution elements imaged by the photocathode element. Typically, a P16 phosphor was used with a decay to 40% of its initial value in .025 microsecond. Such a flying spot scanner capable of providing a light beam with a rapid decay is thought to be necessary for this system in order to obtain the desired resolution and also to prevent residual light from interfering with the measurement of phase between the image dissector and the flying spot scanner.

It is, therefore, one object of the present invention to provide an optical imaging system which is relatively insensitive to ambient light.

A further object is to provide an optical imaging system wherein there is provided a source for projecting and scanning a beam of light and means for selectively sensing said beam of light wherein said light sensitive beam may be accurately adjusted so as to follow the scanning beam of light.

It is a still further object of this invention to provide an optical system capable of providing images of very high resolution.

A further object is to provide an optical imaging system wherein the persistence of the flying spot scanner does not affect the resolution of the image provided by this system.

Briefly, in accordance with the teachings of this invention, the above recited objects are accomplished by providing a flying spot scanner system including a light transmitter for projecting and scanning a beam of light across a field of view, a light sensing means for selectively detecting that portion of the field of view upon which the beam of light is projected, and means for accurately synchronizing the beam of light and the light sensing means. In a preferred embodiment of this invention, the light sensing means takes the form of an image dissector having a photocathode, an electron collector, an apertured disk inserted therebetween, and means for scanning the electron image emitted by the photocathode across the apertured disk. Illustratively, suitable means such as deflection coils are provided to deflect the electron image across the apertured disk and a suitable oscillating current source is provided for driving the deflection coils. It is an important aspect of this invention to provide means for sensing the deflection imparted to the electron image scanned across the apertured disk and to apply a signal derived from the sensing means to the flying spot scanner to thereby directly control the movement of the projected beam of light. Illustratively, the flying spot scanner may take the form of an electrostatic cathode ray tube wherein the deflection of the electron beam and thus the beam of light is achieved by a pair of electrostatic plates. Further, the oscillating current source driving the deflection coils of the image dissector may be sensed as by a resistive element and the voltage thereby derived is amplified and applied to the electrostatic plates of the cathode ray tube to thereby synchronize the movement of the projected beam of light with the scanning of the electron image across the apertured disk.

These and other objects and advantages of the present invention will become more apparent when considered in view of the following detailed description and drawings, in which:

FIGURE 1 is a schematic representation of the elements of one embodiment of the present invention;

FIG. 2 illustrates in a sectioned view a preferred form of the flying spot scanner and the image dissector, and further shows a means for coordinating these devices in accordance with the teachings of this invention; and FIG. 3 illustrates in diagrammatic form a further embodiment of the optical scanning system of this invention.

Referring now to the drawings and particularly to FIG. 1, there is illustrated an optical scanning system in accordance with the present invention. In order to produce a scanning beam of light, there is provided an optical transmitter in the form of a flying spot scanner 10. A suitable transmitter optical system 12 is disposed so as to focus the light generated by the flying spot scanner 10 into a beam 11 of light onto a target 60. As a result of this focusing, the beam of light 11 intersects the target 60 as a projected spot 22. Light is reflected from the target 60, and in particular the projected spot 22, onto a selective light sensing means such as an image dissector 14. Further, a suitable optical system 16 is disposed so as to focus the light upon the image dissector 14.

Referring now to FIG. 2, a specific preferred embodiment of the components of the optical system of this invention will be shown in greater detail. The flying spot scanner 10 may illustratively take the form of a cathode ray tube including an envelope 30 enclosed at one end with a face plate 31. A layer 32 of a suitable light producing phosphor is deposited upon the interior surface of the face plate 31. A beam of electrons is generated by an electron gun 33 and is directed upon the layer 32 of phosphor to thereby provide the desired beam of light 11. Further, the electron gun 33 includes a cathode element 34 for the generation of electrons and a plurality of accelerating and focusing electrodes 36 disposed between said cathode element 34 and said layer 32 to form a beam of electrons in a manner well known in the art. A pair of deflection plates 38 and 40 are disposed about the beam of electrons to control respectively the vertical and horizontal movements of the electron beam. As is shown in FIG. 1, the beam of electrons is directed upon the layer 32 of phosphor to form a scanning spot 20 of light. The beam of electrons is deflected by the plates 38 and 40 to form a pattern whose outline or rastor 18 is indicated upon the face plate 31 of the flying spot scanner 10.

Further, means for selectively viewing and sensing the light reflected from the target 60 may illustratively take the form of the image dissector 14. As shown in FIG. 2, the image dissector 14 may include an envelope 44 enclosed upon one end by a face plate 48. A photocathode element 46 is formed upon the interior surface of the face plate 48 for providing an electron image whose spatial distribution corresponds to the light reflected from the target 60. The electron image emitted from the photocathode element 46 is focused as by electrodes 49 to 52 onto an aperture plate 54. An aperture or window 55 is disposed within the plate 54 and allows a discrete portion of the electron image to be directed therethrough to be received by an electron multiplier made up of a plurality of elements 57. The electrons passing through the aperture 55 are collected by the first multiplier element 57 and is successively multiplied by the remaining elements to be finally collected by an anode element 58 to provide an output signal representing the light image reflected from the target 60. In turn, the output signal may be applied to a suitable display device such as a television monitor for providing a visual image of the target 60. A suitable deflection means such as a magnetic coil 74 may be disposed about the envelope 44 for scanning the electron image emitted by the photocathode element 46 across the window 55. An electrical signal is applied to the magnetic coil 74 as by a deflection driver 76. Illustratively, the driver 76 may have a 2-amp rating and may be of the type designated PDA–PP2 and commercially sold by the Constantine Engineering Labs. Co. As will be explained in greater detail later, means are provided for adjusting the scanning of the electron image as emitted by the photocathode element 46 with the deflection of the light beam as projected by the flying spot scanner 10. Finally, suitable focusing means such as a coil 72 are provided for focusing the electron image as emitted by the photocathode element 46 onto the plane defined by the aperture plate 54.

Referring now to FIGS. 1 and 2, a theory of operation will be set out in order to provide a greater understanding of the advantages of the optical system of this invention. As set out above, light is reflected from the projected spot 22 as well as from the entire surface of the target 60 onto the image dissector 14. As shown in FIG. 1, the light reflected from the entire surface of the target 60 may be focused as by the optical system 16 onto the photocathode element 46 to form an electron image whose outline is represented by the numeral 62. It may be understood that the electron image as emitted by the photocathode element 46 corresponds to the light reflected from the entire surface of the target 60 as well as the light reflected from the spot 22. However, only a small portion of the electron image is allowed to pass through the aperture 55 to form the output signal at any one instant in time.

In order to more clearly explain the operation of this system, that portion of the photocathode element 46 from which electrons are emitted to be directed through the aperture 55 may be represented in FIG. 1 as an aperture portion 26. In turn, though the entire light reflected from the target 60 is directed upon the photocathode element 46 to provide a corresponding electron image, only a small increment of the light reflected from the target 60 is at any instant of time directly providing an output signal from the image dissector 14. More specifically, since only a small increment of electrons emitted by the photocathode element 46 pass through the aperture 55, the output signal is representative at any one instant of time of the light reflected from a small portion of the target 60. In order to conceptionally understand the operation of this system, that small portion of the surface of the target 60 which is being sensed at any one instance may be thought of as a projected aperture 24. Further, the projected spot 22 can be made to correspond to the projected aperture 24 and to that portion of the electron image directed through the aperture 55. Further, the projected aperture 24 or that area which is being selectively sensed by the image dissector 14 may be thought of as being scanned across the surface of the target 60 as by the action of the coil 74 upon the electron image emitted from the photocathode element 46.

Thus, it is an important aspect of this invention to provide means for synchronizing scanning the projected aperture 24 in a corresponding phase relationship with the beam 11 of light as projected by the flying spot scanner 10. An important advantage of such a system as compared with a system using only an electric cell is that ambient light as reflected from other portions of the target 60 are not sensed and the output signal as provided by the image dissector 14 only represents the reflected light from the projected aperture 24. Referring now to FIG. 2 means are shown for synchronizing the deflection of the beam of light 11 projected from the flying spot scanner 10 and the scanning of projected aperture 24 as sensed by the image dissector 14. As set out above, the scanning of the electron image 46 is provided by the magnetic coil 74 which is in turn driven by the deflection driver 76. It is of utmost importance that the synchronization between these two scanning operations be carried out as accurately as possible, and in order to avoid the inherent inaccuracies and lags produced by mechanical systems, an electrical signal is derived which corresponds to the rate of deflection and is supplied to the deflection plates 38 and 40. Illustratively, a resistive element 78 is placed within the circuit of the deflection driver 76 to provide a voltage which is applied by an amplifier circuit 80 to the deflection plates 38 and 40. Illustratively, the amplifier circuit 80 is of the type described in Basic Television, Principles and Servicing, by Crab, Chapter 17, "Deflection Circuits," Sec. 17–2, "Electrostatic Deflectors With Blocking Oscillator and Discharge Tube," pages 325 to 327, and includes elements for amplifying the voltage signal derived from the resistive element 78 and a balanced deflection system for applying appropriate sawtooth voltage signals to the deflection plates 38 and 40.

Referring now to FIG. 3, an alternative embodiment of the optical system of this invention is shown which is particularly adapted for viewing and detecting information as contained upon photographic slides, celluloid transparencies or other types of mediums for storing in miniaturized form great quantities of information. The optical system includes a flying spot scanner 110 for scanning a flying spot 120 in a pattern to form a raster and to thereby provide a beam of light which is projected and scanned across the surface of a target 160. On the opposite side of the target 160 with respect to the flying spot scanner 110 there is disposed suitable means for selectively viewing an incremental portion of the target 160, such as an image dissector 114. The beam of light projected by the flying spot scanner 110 is modulated in accordance with the image or other indicia of information upon the viewed target 160 and is focused as by a suitable optical system (not shown) onto a photocathode element 146 of the image dissector 114. As described above with respect to FIG. 2, an electron image is generated by the photocathode element 146 corresponding to the light image focused thereon and is scanned by a deflection coil 174 across the surface of an aperture plate 154. A small increment of the electron image is allowed to pass through an aperture or window 155 within the plate 154. The electrons passing through the aperture 155 multiplied by an electron multiplier (not shown) provide an output signal corresponding to the information contained upon the target 160. Further, means are provided as described above with regard to FIG. 2 for synchronizing the beam of light as projected by the flying spot scanner 110 with the incremental area of the target 160 that is viewed by the image dissector 114. In addition, suitable focusing means including coils 172 are provided about the image dissector 114 so that the electron image as emitted by the photocathode element 146 may be focused in the plane of the aperture plate 155.

A significant feature of the system shown in FIG. 3 allows the selective viewing of different portions of the information stored by the target 160. More specifically, the flying spot 122 may be scanned by the flying spot scanner 110 so that a raster as shown by the outline 118 is formed. A resulting beam of light is projected and scanned across the surface of a target 160 corresponding to a field of scan indicated by the outline 156. In turn, a light image indicated by the outline 162 is focused upon the photocathode 146. Further, the electron image as emitted by the photocathode element 146 is focused to form a projected electron image 166 which is scanned as described above across the surface of the aperture plate 154. However, it may be desired to view a different portion of the target 160 and to magnify this portion for greater inspection. Thus, a smaller field of scan 158 may be selected upon the target 160 for viewing. Generally, this may be accomplished by adjusting the flying spot scanner 110 to scan a raster as indicated by the outline 122 and to thereby selectively scan a beam of light across the surface of the target indicated by the field 158. More specifically, the amplitude of the sawtooth signals which are applied to the deflection plates (not shown) of the flying spot scanner 110 is controlled by a deflection amplifier circuit as described above. In turn, light will be focused upon a portion of the photocathode element 146 designated by the outline 164. In accordance with the teachings of this embodiment, the electron image as emitted from the portion 164 of the photocathode element 146 is scanned across the apertured member 155 so as to substantially fill the outline 166. More specifically, the scanning of the electron image from the outline 164 has been increased to fill the outline 166 by adjusting the amplitude of the current signal applied by the current deflection driver connected to the coils 174. In this manner, a portion of the target i.e., 158, may be selectively viewed by the image dissector 114 and a magnified image will be displayed as upon a television monitor of this portion of the target 160.

It is noted with regard to the embodiment shown in FIG. 3 that the target being viewed is relatively close to the flying spot scanner and the image dissector, (i.e. typically less than a foot apart). As a result, there is no appreciable time lapse due to light traveling to a distant object and being reflected. Thus, it is necessary that the relative scanning operations of the light projector and the image dissector be performed in precise synchronization without any time or phase lag. The sensing system as described with respect to FIG. 2 is ideally suited to meet this requirement.

Thus, there has been described an optical system capable of projecting and scanning a beam of light onto a target to be viewed and of selectively sensing that portion of the target surface upon which the beam of light is being directed. More particularly, means are provided for electrically sensing the selective scanning of an image dissector and for applying an electrical signal to the flying spot scanner to thereby accurately and precisely synchronize the scanning of the projected beam of light therewith. Such a system as described above has significant advantages over similar systems using mechanical means in that the synchronization may be achieved with greater accuracy. Further, the system hereindescribed has the advantage as compared with the copending application of Humiston et al., that a greater output may be achieved from the image dissector. More specifically, the phosphor beam of light as used by the flying spot scanner within the copending application requires a very short decay, so that beams of light projected by the successive flying spots would not interfere with each other. As a result, such phosphors are relatively inefficient and the intensity of the light emitted therefrom is limited. However, more accurate synchronization between the scanning of the light beam and the scanning of the area to be viewed may be achieved, and more efficient phosphors may be used without the problems of sensing the previously lighted spots of the cathode ray tube.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

I claim as my invention:

1. An electro-optical scanning system for translating information appearing as an image on a transparency into a corresponding electron image, comprising, flying spot scanner means for scanning one surface of said transparency with a constant intensity light beam which forms a flying spot of light at the intersection with the transparency, an image dissector receiver means, including a substantially non-storage type photocathode surface, an apertured member, and suitable deflection means for scanning said apertured member across said photocathode surface, said receiver means positioned in opposed relationship with said flying spot scanner means such that the aperture member is projected onto a second and opposite surface of said transparency, means for applying a varying current to said suitable deflection means to control the scanning of said apertured member, and means responsive to said varying current signal for synchronizing the scanning rates of said flying spot scanner means and said image dissector receiver means such that a projection of the aperture of said receiver means onto said transparency intersects said scanning beam of light.

2. An electro-optical system as claimed in claim 1, wherein said flying spot scanner means takes the form of a cathode ray tube including an electron gun for generating and projecting a beam of electrons, a target element for producing light in response to the bombardment of said beam of electrons, and at least two electrostatic deflection plates disposed about said beam of electrons for controlling the scanning of said beam of electrons, said synchronizing means electrically connected to said electrostatic deflection plates to thereby control the scanning of said beam of electrons in response to said varying signal.

3. An electro-optical system as claimed in claim 2 wherein said cathode ray tube has a high efficiency phosphor on the face thereof.

4. An electro-optical system as claimed in claim 1, wherein said synchronizing means includes a resistive element associated with said means for scanning the apertured member to provide a voltage signal in response to the variations of said signal current and a voltage signal amplifier electrically connected to sense said voltage signal and to apply a signal in response thereto to said electrostatic deflection plates.

5. An electro-optical system as claimed in claim 1 further including first means associated with said electrostatic deflection plates for controlling the area over which said beam of light is projected and scanned by said flying spot scanner means, and second means associated with said suitable deflection means for varying the area over which said electron image as emitted from said photocathode surface is scanned.

References Cited

UNITED STATES PATENTS

| | | | |
|---|---|---|---|
| 2,510,070 | 6/1950 | Cawein | 178—6.8 |
| 2,954,427 | 9/1960 | Covely et al. | 178—6.8 |
| 3,221,099 | 11/1965 | Breitbord | 178—7.2 |
| 3,225,138 | 12/1965 | Montani | 178—7.2 |

OTHER REFERENCES

The International Dictionary of Physics and Electronics. Second Edition, D. Van Nostrand Company, Inc., Received: May 8, 1961, pp. 584, 1121, 1187, 1189.

ROBERT L. GRIFFIN, *Primary Examiner.*

RICHARD K. ECKERT, JR., *Assistant Examiner.*

U.S. Cl. X.R.

178—7.2